(12) United States Patent
Hohmann et al.

(10) Patent No.: US 12,281,776 B2
(45) Date of Patent: Apr. 22, 2025

(54) LIGHT-GUIDE ELEMENT FOR A LIGHTING DEVICE FOR A MOTOR VEHICLE

(71) Applicant: HELLA GmbH & Co. KGaA, Lippstadt (DE)

(72) Inventors: Carsten Hohmann, Warstein (DE); Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/666,492

(22) Filed: May 16, 2024

(65) Prior Publication Data

US 2024/0302019 A1    Sep. 12, 2024

Related U.S. Application Data

(63) Continuation of application No. PCT/EP2022/081034, filed on Nov. 8, 2022.

(30) Foreign Application Priority Data

Nov. 16, 2021    (DE) .................... 10 2021 129 851.2

(51) Int. Cl.
*F21S 41/365*    (2018.01)
*F21S 43/239*    (2018.01)
(Continued)

(52) U.S. Cl.
CPC ........... *F21S 43/239* (2018.01); *F21S 41/365* (2018.01); *F21S 43/245* (2018.01); *F21S 43/247* (2018.01)

(58) Field of Classification Search
CPC .......... F21S 41/36; F21S 41/365; F21S 41/24; F21S 43/239; F21S 43/245; F21S 43/253
See application file for complete search history.

(56) References Cited

U.S. PATENT DOCUMENTS 11,391,435 B2    7/2022    Thomae et al.
2006/0109669 A1*    5/2006    Tanaka ................... F21S 41/365
                                                            362/459

(Continued)

FOREIGN PATENT DOCUMENTS

CN    211176641 U    8/2020
CN    212987095 U    4/2021
(Continued)

OTHER PUBLICATIONS

International Search Report dated Feb. 3, 2023 in corresponding application PCT/EP2022/081034.

*Primary Examiner* — Sean P Gramling
(74) *Attorney, Agent, or Firm* — Muncy, Geissler, Olds & Lowe, P.C.

(57) ABSTRACT

A light-guide element for a lighting device for a motor vehicle, wherein the light-guide element has a defined position for a light-emitting diode, a first reflection surface, a second reflection surface, and an outcoupling surface. The defined position, the first reflection surface, the second reflection surface, and the output coupling surface are arranged relative to one another such that light from the light-emitting diode is emitted from the defined position in a first light direction to the first reflection surface, is reflected at the first reflection surface to the second reflection surface in a second light direction substantially opposite to the first light direction and can be deflected from the second reflection surface onto the outcoupling surface in a third light direction.

14 Claims, 12 Drawing Sheets

(51) Int. Cl.
    *F21S 43/245*    (2018.01)
    *F21S 43/247*    (2018.01)

(56)             References Cited

U.S. PATENT DOCUMENTS

2006/0126353 A1*  6/2006  Ishida ................... F21S 41/321
                                                          362/543
2014/0036526 A1   2/2014  Sato et al.
2016/0102829 A1   4/2016  Sun et al.
2020/0240610 A1*  7/2020  Thomae ............... G03H 1/2202

FOREIGN PATENT DOCUMENTS

DE         602004001128 T2    12/2006
DE         102017124296 A1     4/2019
EP              1589282 A1    10/2005
EP              2693105 A2     2/2014
JP             2013229153 A   11/2013
JP             2019220411 A   12/2019
KR            20190080506 A    7/2019
WO          WO2018069792 A1    4/2018

* cited by examiner

LIGHT-GUIDE ELEMENT FOR A LIGHTING DEVICE FOR A MOTOR VEHICLE

This nonprovisional application is a continuation of International Application No. PCT/EP2022/081034, which was filed on Nov. 8, 2022, and which claims priority to German Patent Application No. 10 2021 129 851.2, which was filed in Germany on Nov. 16, 2021, and which are both herein incorporated by reference.

BACKGROUND OF THE INVENTION

Field of the Invention

The present invention relates to a light-guide element for a lighting device for a motor vehicle, to a lighting device, and to a motor vehicle.

Description of the Background Art

Since the introduction of LED technology in the late 1990s and the constant advancement and adaptation of optical technologies and components to the small LED light sources, a wide range of different optical systems and a constant search for new optical systems and lighting effects have emerged in automotive lighting technology.

Light guidance technology in particular thrives on the use of LED light sources. A large number of light-guide systems have been established for the signal functions of a vehicle-taillight, brake light, direction indicator, and daytime running light- and are constantly being optimized and modified. Thus, for example, rod-shaped light guides are used as direct light-emitting light guides, for example, for taillights and daytime running lights with elongated light signatures.

So-called EdgeLight light guides are also suitable for elongated light signatures. These are plate-shaped light guides on the back of which light from LED light sources is coupled in, passes through the EdgeLight to the front edge by means of total reflection, and is then emitted at the narrow front edge. Advantageously, EdgeLight light guides can take on any contour and therefore form the light signatures required by the design in a very variable manner.

Smaller or larger light-guide surfaces, flat light guides, also known as light curtains, are used for flat illuminated surfaces.

Furthermore, light-guide elements are used as primary optics or TIR optics (TIR=Total Internal Reflection).

Light guide technology is a frequently and readily used technology in the design and implementation of lighting systems in automotive lighting technology and beyond. However, in addition, there is a strong desire, driven primarily by the styling and design of vehicles and in particular by lighting designers, to constantly consider new technologies, systems, and effects and make them ready for mass production for automotive lighting technology, as a new appearance or technology or a major advancement is realized in vehicles with every vehicle generation.

Various examples of edge-lit light-guiding bodies are described in DE 10 2017 124 296 A1, which corresponds to US 2020/0240610. They all have in common a very short forward-directed incoupling distance of the light to a deflection or reflection surface. The short incoupling distance has the effect that the light from the light source can only spread in a narrow, limited space or angular range in the light-guide body and therefore the size of the illuminated outcoupling surface, in particular the width of the illumination area and therefore the width of the light-guide element, is very limited.

The current design trend in vehicle lighting has been developing for years in the direction of ever narrower and elongated lights; i.e., the height of the lights and headlights is continually being reduced and their length is continually increasing. This is particularly evident with rear lights and headlights, which are designed as a complete light strip and extend across the entire width of the vehicle. The rear of the vehicle is usually equipped with three-part lights, two exterior lights, and a center light mounted on the trunk lid.

For such narrow light designs, light-guide elements and edge-lit light guides are therefore also to be provided as narrow but at the same time wide elements for optimal integration. This cannot be realized, however, with the principle from DE 10 2017 124 296 A1 with the short incoupling distances, or only with a high expenditure for parts and LED light sources.

SUMMARY OF THE INVENTION

It is therefore an object of the present invention to provide an improved light-guide element which at least partially overcomes the disadvantages known from the prior art.

In this regard, features and details disclosed in relation to the light-guide element of the invention also apply, of course, in relation to the lighting device of the invention, and to the motor vehicle of the invention, and conversely in each case, so that with regard to the disclosure, reference is or can always be made mutually to the individual aspects of the invention.

According to a first aspect of the invention, the initially stated object is achieved by a light-guide element, in particular an edge-lit light-guide element, for a lighting device for a motor vehicle, wherein the light-guide element has a defined position for a light-emitting diode, a first reflection surface, a second reflection surface, and an outcoupling surface, wherein the defined position, the first reflection surface, the second reflection surface, and the outcoupling surface are arranged (relative) to one another in such a way that light from the light-emitting diode is emitted from the defined position in a first light direction to the first reflection surface, is reflected at the first reflection surface to the second reflection surface in a second light direction substantially opposite to the first light direction, and can be deflected from the second reflection surface onto the outcoupling surface in a third light direction.

A light-guide element with a compact design is provided thereby, in particular with a form factor for realizing a greater width at a lower height, in which there is a light incoupling and geometry that provides a sufficiently large incoupling distance for the desired wide design with uniform illumination of the surface.

This object is achieved by the described light directions. By opposing the first and second light directions and the additional third light direction, backward incoupling with folding of the light path in the light-guide element is achieved. It could also be said that the LED light or light-emitting diode light is coupled into the light-guide element opposite to the intended emission direction or illumination direction of the lighting device. The light is then reflected in the forward direction at the first reflection surface, which is located particularly at the rear in the intended emission direction or in the light-guide element. The light thus reaches the second reflection surface, which can also be referred to as the front reflection surface. The second reflection surface can also be referred to as a deflection reflection surface, which directs the light onto the outcoupling surface of the light-guide element.

The path length for the light is created by the opposite, backward-directed light incoupling in order to be able to illuminate wide illumination areas as well with the first or rear reflection surface. In so doing, a side-emitter LED, therefore, a light-emitting diode that emits light from the side, can be used as the light-emitting diode. It is also possible to use a top-emitter LED or top LED, therefore, a light-emitting diode that emits light upwards from its housing. The light-guide element can be provided in this case with a large width and, in contrast, a smaller height of an intended illumination surface.

The fact that the lighting device is designed for a motor vehicle means in particular that the lighting device is suitable for use in a motor vehicle. Nevertheless, other fields of application of the lighting device of the invention are also conceivable and possible. However, the field of application of the motor vehicle is particularly preferred. Thus, very particularly, the lighting device can be a vehicle lighting device. For example, the lighting device can be a rear light or taillight, an auxiliary light, a headlight, or the like.

In particular, the first reflection surface can be arranged opposite the second reflection surface. In this case, the defined position or the light-emitting diode can be arranged between the first reflection surface and the second reflection surface in order to enable the already described light path or light directions.

The second reflection surface can be set at an angle (in particular with respect to the first reflection surface and/or the second light direction) in order to deflect or outcouple the light of the light-emitting diode from the second reflection surface onto the outcoupling surface. In this respect, the second reflection surface can also be referred to as a deflection reflection surface.

The second reflection surface and the second outcoupling surface can be arranged or formed next to each other or directly side by side. The second reflection surface can also be arranged or formed on an upper section or an upper side of the light-guide element. Further, the first reflection surface can be arranged or formed on the upper section or upper side of the light-guide element. The first reflection surface can be formed convex.

The outcoupling surface can be arranged at an angle in the range between 90° inclusive and 170° inclusive, in particular in the range between 110° inclusive and 160° inclusive, very particularly in the range between 130° and 150° inclusive, to the second reflection surface. Similarly, there can be an angle, which may be in the range from 60° inclusive to 120° inclusive, for example, between the aforementioned upper section of the light-guide element and the first reflection surface. Further, an angle, which can be in the range from 120° inclusive to 160° inclusive, for example, can also be provided between the second reflection surface and the upper section of the light-guide element. The specified, exemplary angle ranges allow a compact design of the light-guide element while at the same time enabling the desired light directions to achieve uniform illumination of the outcoupling surface.

The defined position can be located on the upper section or upper side of the light-guide element. The upper section connects the first reflection surface to the second reflection surface. In addition, the defined position can be formed as an opening or a light entry area for the light-emitting diode. The light-emitting diode can therefore be arranged or positioned in the opening.

A holographic element or optical scattering element can be arranged or formed on the outcoupling surface. In this regard, holography is a very interesting topic in terms of lighting technology. Holography, in the form of volume holograms, can create three-dimensional luminous images and light signatures which, floating freely in space, enable completely new effects and light signatures. Today's technologies, in contrast, are always two-dimensional when a lens is backlit or a light guide forms a light signature. Volume holograms can be used for luminous 3D image holograms, in particular films with a photopolymer layer in which the desired holographic image information is imprinted. The vehicle manufacturer's lighting designer has a completely free hand in the three-dimensional design of the holographic image, as it can now also be generated and processed as a digital hologram. Previously, an existing object had to serve as a hologram, which was illuminated by a laser for an analog hologram in order to generate the image information for the interference with the reference beam (=illumination direction of the hologram). When holography and the described light-guide technology are brought together, the result is a so-called edge-lit hologram, a hologram that is applied to a light-guide surface (as a film volume hologram), wherein the light guide is illuminated from an edge (=edge-lit). In principle, these can be flat light-guide disks with edge lighting or also thick-walled bodies, usually for smaller hologram surfaces.

Accordingly, in particular, a holographic film, in particular a photopolymer film, can be arranged or applied to the outcoupling surface. The holographic element can be glued, for example, flat onto the outcoupling surface or inserted into the injection mold during the injection molding process of the light-guide element and back-molded with the light-guide element. By illuminating the holographic element, any hologram information defined therein (for example, graphics, objects, texts, symbols, etc.) is reconstructed and the hologram becomes visible to a viewer. As an alternative or in addition to using a holographic element, it is conceivable, for example, to use one or more optical scattering elements. The optical scattering element(s) can be applied to the outcoupling surface or formed on it, in particular integrally. The optical scattering element can be designed in the form of micro-optics, a microstructure, or a diffractive optical structure, for example, and can thus be used directly as a luminous body.

The light-guide element can be produced cost-effectively and easily as a plastic injection-molded part. In particular, it can be manufactured with a transparent plastic.

According to a second aspect of the invention, the initially stated object is achieved by a lighting device for a motor vehicle, wherein the lighting device comprises a light guide according to the first aspect of the invention and a light-emitting diode arranged at the defined position of the light guide.

In this regard, the lighting device can comprise a plurality of light guides, in particular at least two or more light guides, arranged side by side in a row, each having light-emitting diodes arranged at their defined positions.

As previously mentioned, the light-emitting diode can be a top-emitter LED or a side-emitter LED, for example.

Finally, the lighting device can comprise at least one further light-emitting diode and at least one further reflection surface, which is set up to be illuminated by the at least one further light-emitting diode.

According to a third aspect of the invention, the initially mentioned object is achieved by a motor vehicle having a lighting device according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
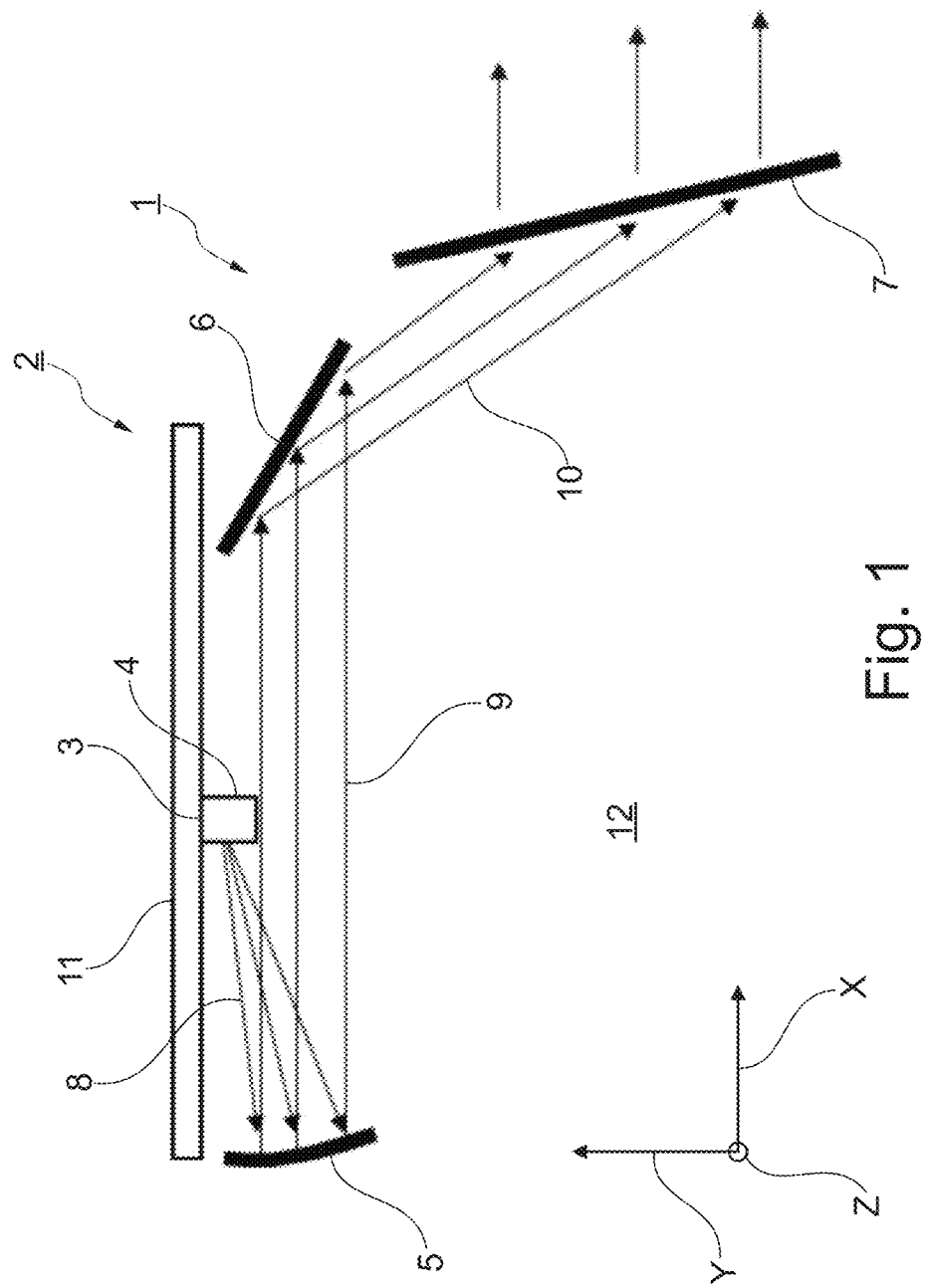
FIG. 1 shows a schematic view of a lighting device according to an example of the invention.

FIG. 1 shows a schematic view of an example of a lighting device 2 of the invention with a light-guide element 1 of the invention.

Lighting device 2 comprises light-guide element 1, which, as can be gathered from the schematic view in FIG. 1, comprises at least one first reflection surface 5, a second reflection surface 6 opposite first reflection surface 5 and set at an angle, and an outcoupling surface 7.

Figure 3:
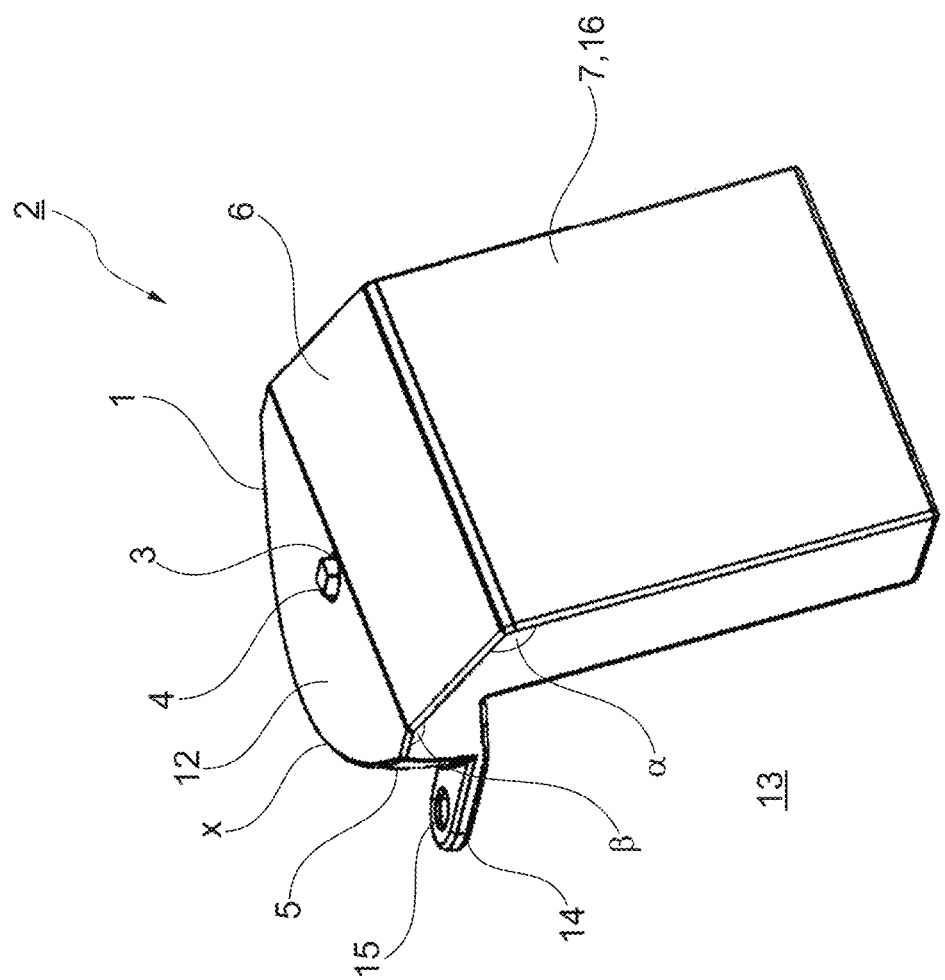
FIG. 3 shows a perspective view of the lighting device from FIG. 1.

As shown in FIG. 3 in a perspective view of an example of light-guide element 1, light-guide element 1 is designed as an integral body on which first reflection surface 5, second reflection surface 6, and outcoupling surface 7 are formed. Light-guide element 1 can be manufactured simply and cost-effectively as a plastic injection-molded part. In addition, it can be made transparent.

Lighting device 2 further comprises a light-emitting diode 4, which is arranged or fixed at a defined position 3 of light-guide element 1. As can be gathered especially well from FIGS. 3 and 6, in the present case defined position 3 is formed as an opening, in particular as a hole in an upper section 12 or on an upper side of light-guide element 1. Light-emitting diode 4 is held in this defined position 3 in the mounted state.

Lighting device 2 also comprises a printed circuit board 11, on which light-emitting diode 4 is arranged, for controlling light-emitting diode 4. As can be gathered from FIG. 5, printed circuit board 5 is arranged or fixed above or opposite upper section 12 of light-guide element 1.

FIG. 1 now shows the functional principle of the illumination of lighting device 2 by means of light-emitting diode 4 using the example of a side-emitter LED for light-emitting diode 4, therefore, a side-emitting light-emitting diode 4, by means of corresponding light beams or light directions indicated by arrows 8, 9, 10. A coordinate system with directions x, y, z supports the explanation.

Light is emitted from light-emitting diode 4 to first reflection surface 5 with first light direction 8 substantially opposite to the x-direction shown. Basically, this means that this does not have to be the only direction that the light follows. Thus it can be seen that first light direction 8 actually has a component in the opposite x-direction and in the opposite y-direction; therefore, it runs downwards to the left in the image plane. This is because light-emitting diode 4 is arranged above or at an upper height of first reflection surface 5. Thus, first light direction 8 runs substantially opposite to the actual illumination direction of lighting device 2, which is the x-direction, because the light is to be outcoupled at outcoupling surface 7, in order to illuminate the road. In other words, the light inside light-guide element 1 initially travels opposite to the actual direction in which it is to be coupled out of light-guide element 1.

Having reached first reflection surface 5, the light is reflected in the direction to second reflection surface 6. The thus resulting second light direction 9 of the light from light-emitting diode 4 corresponds to the x-direction. Here, reflection surface 5 is set at an angle, in particular substantially at right angles, to upper section 12 or the upper side of light-guide element 1 and is formed convex, for example, (see FIG. 6).

At second reflection surface 6, the light is finally deflected onto outcoupling surface 7 by the inclined position of second reflection surface 6 relative to the x-direction or second light direction 9 and first reflection surface 5.

The light then strikes outcoupling surface 7 with the third light direction 10, which has a component in the x-direction and a component opposite to the y-direction. The light is then outcoupled from outcoupling surface 7, which in turn is set at an angle to the x-direction and to second reflection surface 6 (see arrows behind outcoupling surface 7).

Figure 2:
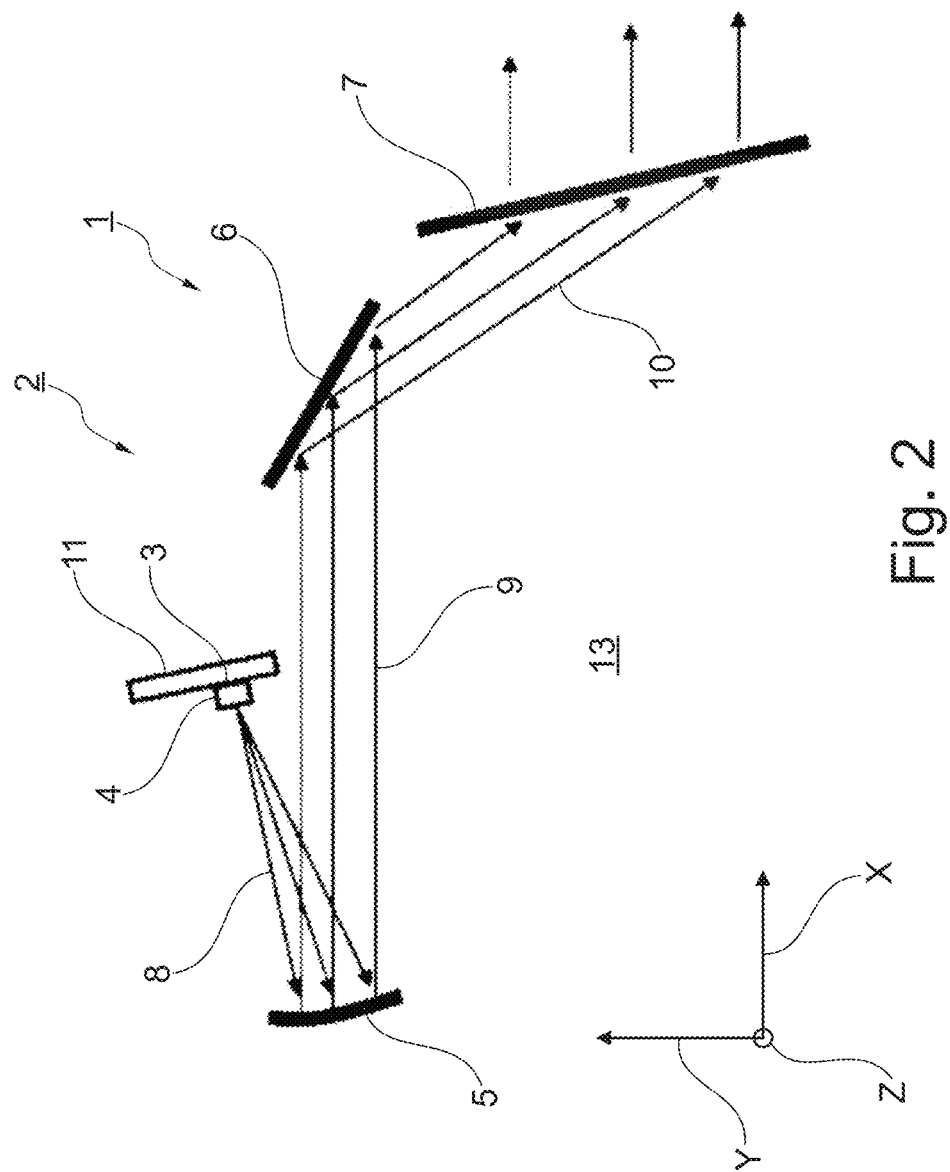
FIG. 2 shows a schematic view of a lighting device according to an example of the invention.

As FIG. 2 shows in a schematic view similar to FIG. 1, but for a further example of lighting device 2, a top-emitter LED can basically also be used as light-emitting diode 4, which emits light from the front instead of the side. Accordingly, light-emitting diode 4 and printed circuit board 11 are arranged differently in the example in FIG. 2 than in the example in FIG. 1. Overall, it can be seen that the use of a side-emitter LED can enable a more compact design of lighting device 2 than the use of a top-emitter LED.

As already explained, FIG. 3 shows a perspective view of a light-guide element 1 according to the example of FIG. 1, in which a side-emitter LED is used as light-emitting diode 4.

The angle α indicated here between first reflection surface 5 and upper section 12 or the upper side of light-guide element 1 can be gathered further from FIG. 3; it is essentially 90° here, for example, but can also be in the range from 60° inclusive to 120° inclusive. The angle β between second reflection surface 6 and upper section 12 or the upper side of light-guide element 1, which are also arranged next to each other, is also indicated in FIG. 3. The angle β can be, for example, in the range of 90° to 160°, in particular in the range of 120° inclusive to 150° inclusive. Finally, the angle γ between outcoupling surface 7 and second reflection surface 6, which are also arranged next to each other, is also indicated. The angle γ can, for example, lie in a range between 90° inclusive and 170° inclusive, in particular between 120° inclusive and 150° inclusive.

There are also opposing lateral sections on light-guide element 1, which connect first reflection surface 5, second reflection surface 6, and outcoupling surface 7. Further, behind outcoupling surface 7 or below first reflection surface 5 and second reflection surface 6, there is a free installation space 13 which can be used for further components of lighting device 2, for example, a further reflection surface 21, as can be gathered from FIG. 11.

Figure 6:
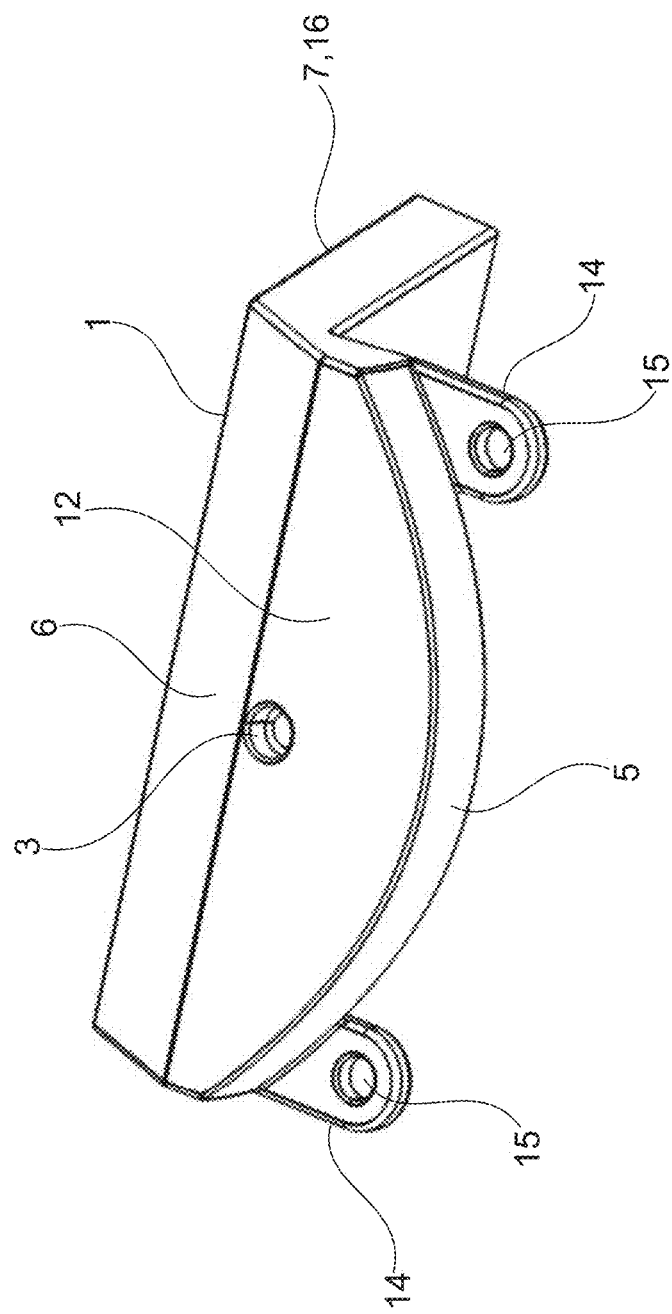
FIG. 6 shows a perspective view of the light-guide element of the lighting device of FIG. 1.

Further, it can be seen in FIG. 3, as well as in FIG. 6, which shows another perspective view of light-guide element 1, that fastening elements 14, in particular fastening arms, with corresponding fastening openings 15 are arranged on light-guide element 1, in particular on first reflection surface 5. Fastening elements 14 are each arranged at opposite ends of light-guide element 1, in particular arranged integrally with light-guide element 1. They allow a simple fastening, for example, by screwing, of light-guide element 1 in a corresponding holding element (not shown) of lighting device 2 or in motor vehicle 24 (see FIG. 12) for relative positioning with respect to light-emitting diode 4.

Finally, in the present case, a holographic element 16, for example, a holographic film, in particular a photopolymer film, is arranged or applied to outcoupling surface 7. Holographic element 16 can, for example, be glued flat onto outcoupling surface 7 or inserted into the injection mold during the injection molding process of light-guide element 1 and back-molded with light-guide element 1. By illuminating holographic element 16, any hologram information defined therein (for example, graphics, objects, texts, symbols, etc.) is reconstructed and the hologram becomes visible to the viewer.

Figure 7:
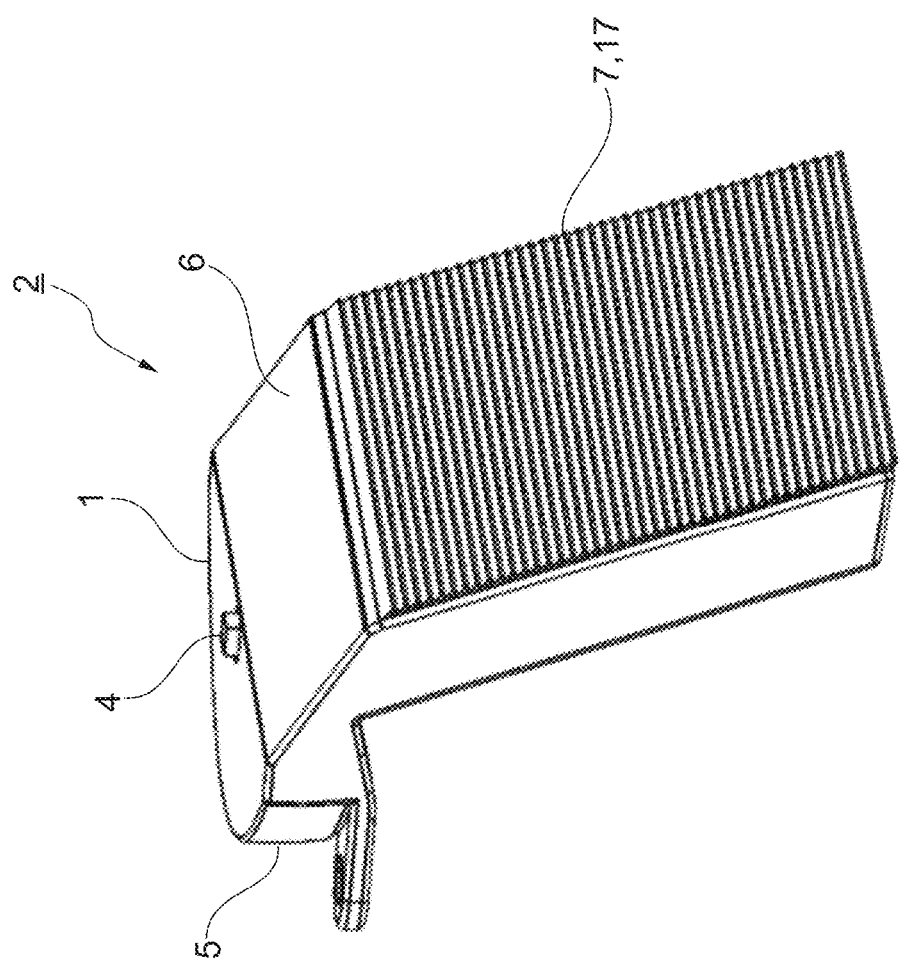
FIG. 7 shows a perspective view of the lighting device from FIG. 1 with a modified light-guide element.

As an alternative to using a holographic element 16, it is conceivable, for example, to use one or more optical scattering elements 17, as FIG. 7 shows in a further perspective view of light-guide element 1 of the example of FIG. 1. Optical scattering element(s) 17 can be applied to outcoupling surface 7 or formed on it, in particular integrally. The optical scattering element can be designed in the form of micro-optics, a microstructure, or a diffractive optical structure, for example, and can thus be used directly as a luminous body.

Figure 8:
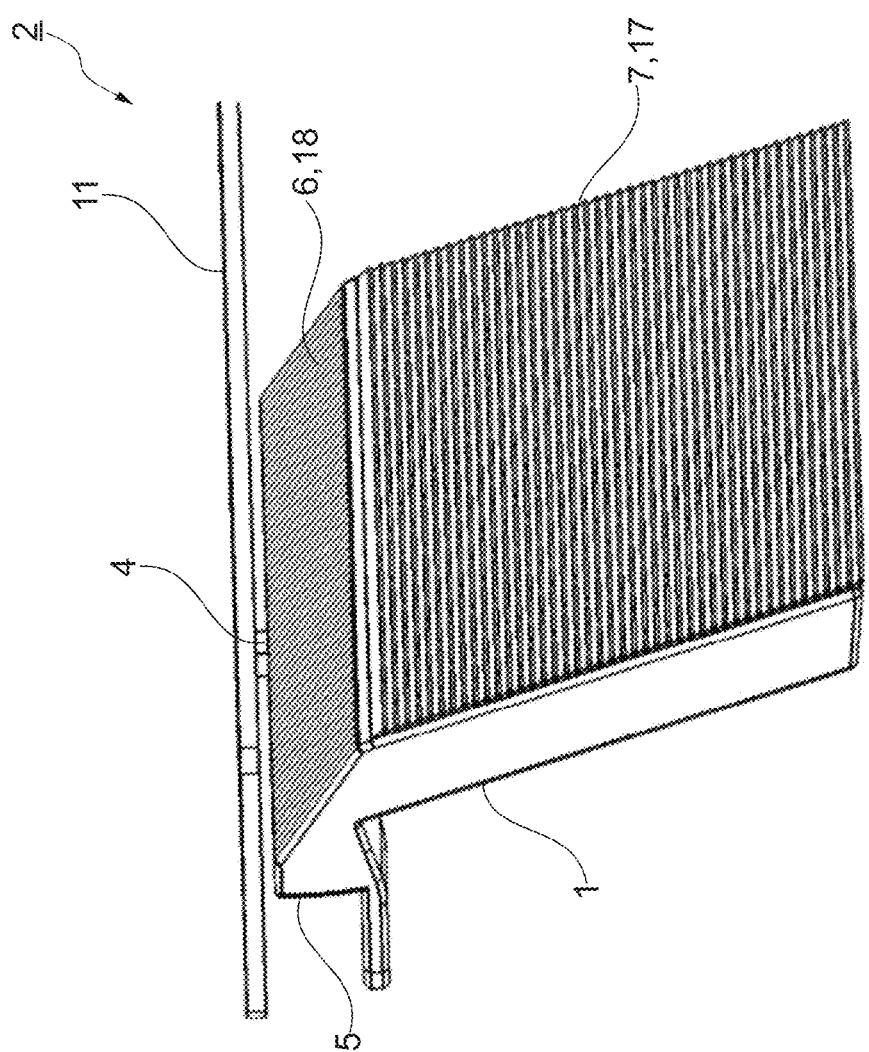
FIG. 8 shows a perspective view of the lighting device from FIG. 1 with a light-guide element modified further beyond FIG. 7.

As a further variation, an optical scattering element 18 can also be arranged or formed on the inclined second reflection surface 6; in particular a light-scattering structure or optics can be provided, which can contribute to additional light mixing and possibly better homogeneity of the illumination, as FIG. 8 shows in a further perspective view of lighting device 2 of the example of FIG. 1.

Figure 4:
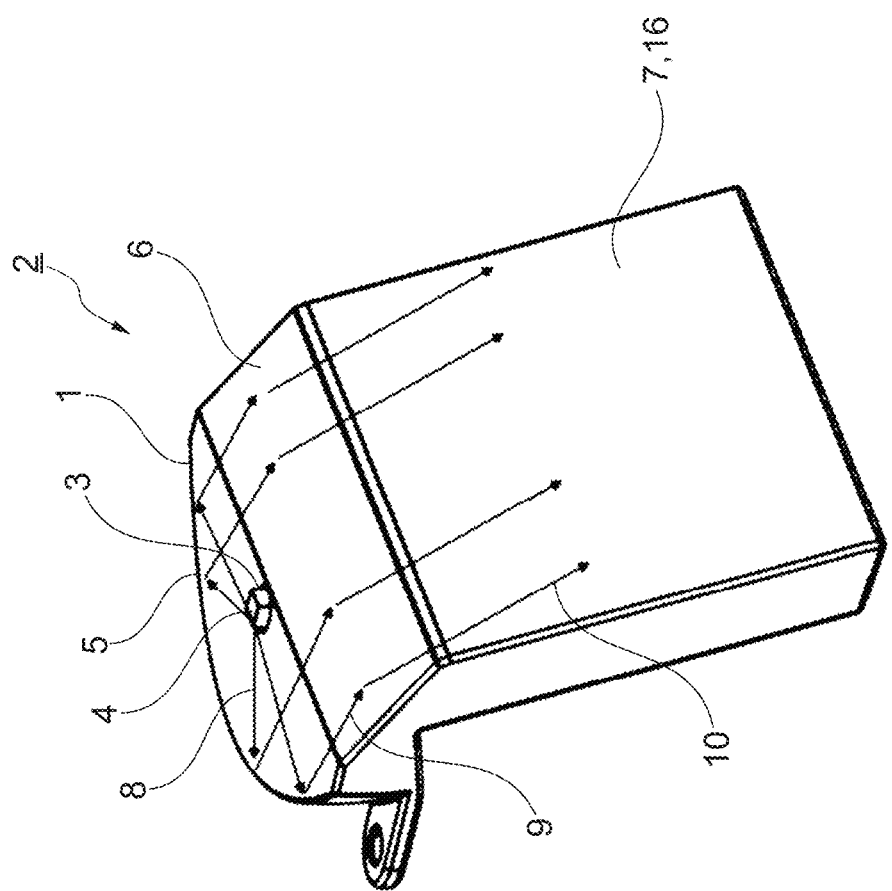
FIG. 4 shows a perspective view of the lighting device from FIG. 3 with the light directions or light paths indicated.
Figure 5:
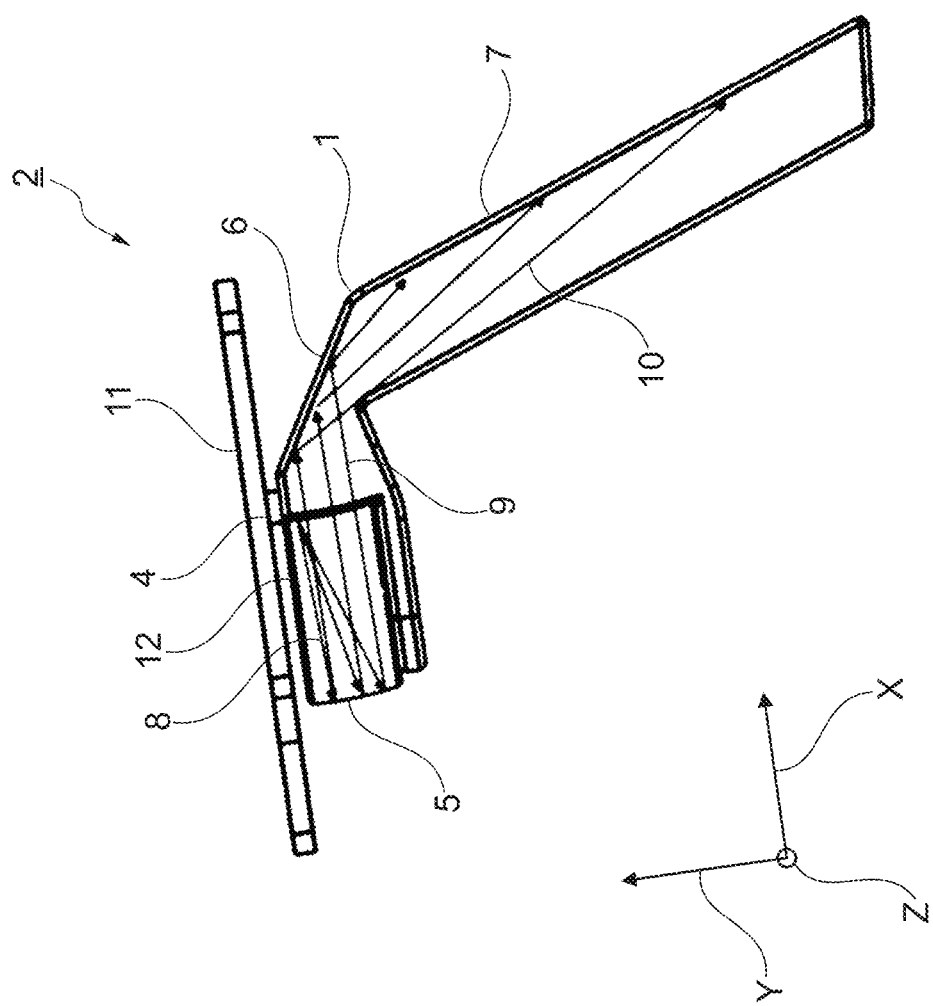
FIG. 5 shows an sectional view of the lighting device of FIG. 1.

FIGS. 4 and 5 illustrate once again the beam path of the light with the first light direction 8, the second light direction 8, and the third light direction 10 in lighting device 2 of the example of FIG. 1 in a perspective view and in a sectional view and thus in different views.

Figure 9:
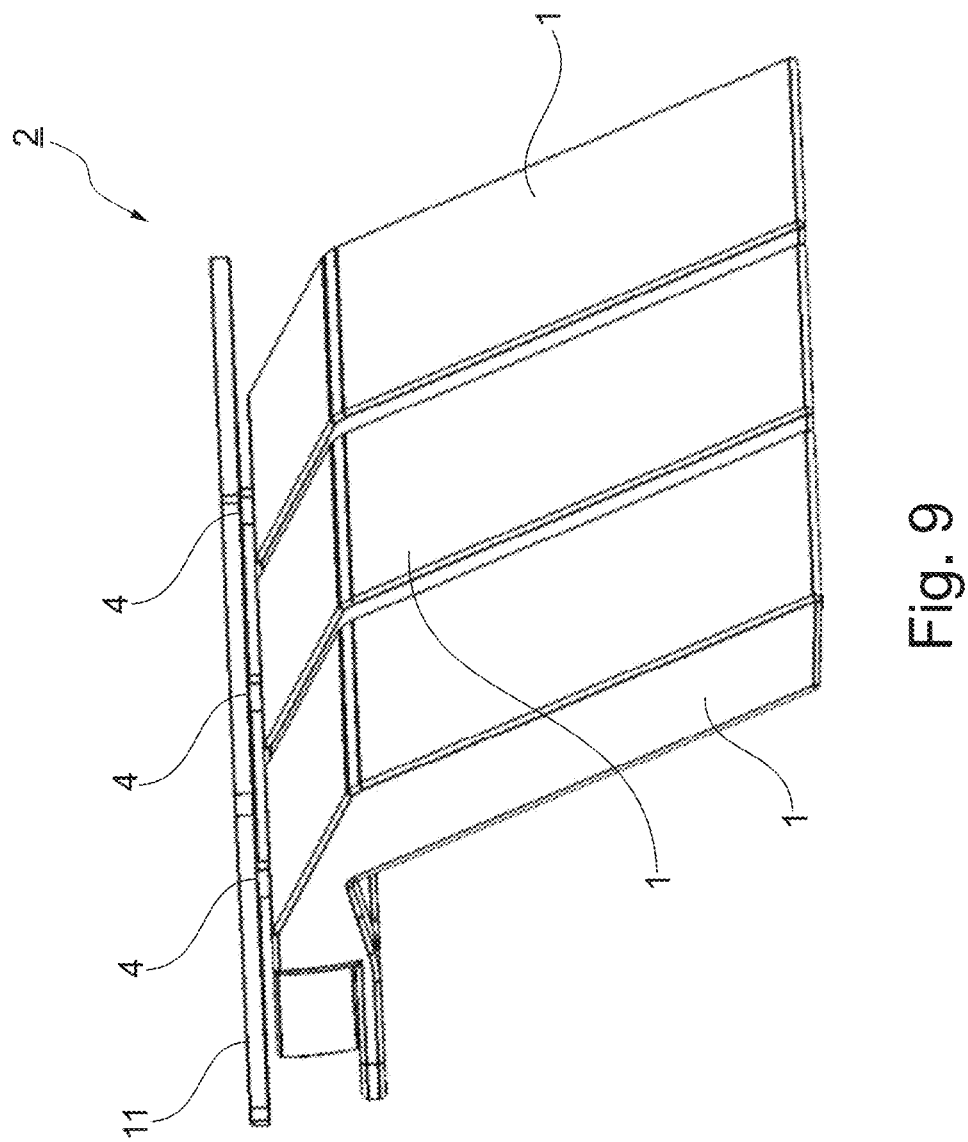
FIG. 9 shows a perspective view of a lighting device according to an example of the invention with three light-guide elements.

FIG. 9 shows how a plurality of light-guide elements 1 are positioned or arranged side by side in a lighting device 2 in order to provide a broader, extended lighting function. In this case, the individual light-emitting diodes 4 can be arranged on each individual or a common printed circuit board 11.

Figure 10:
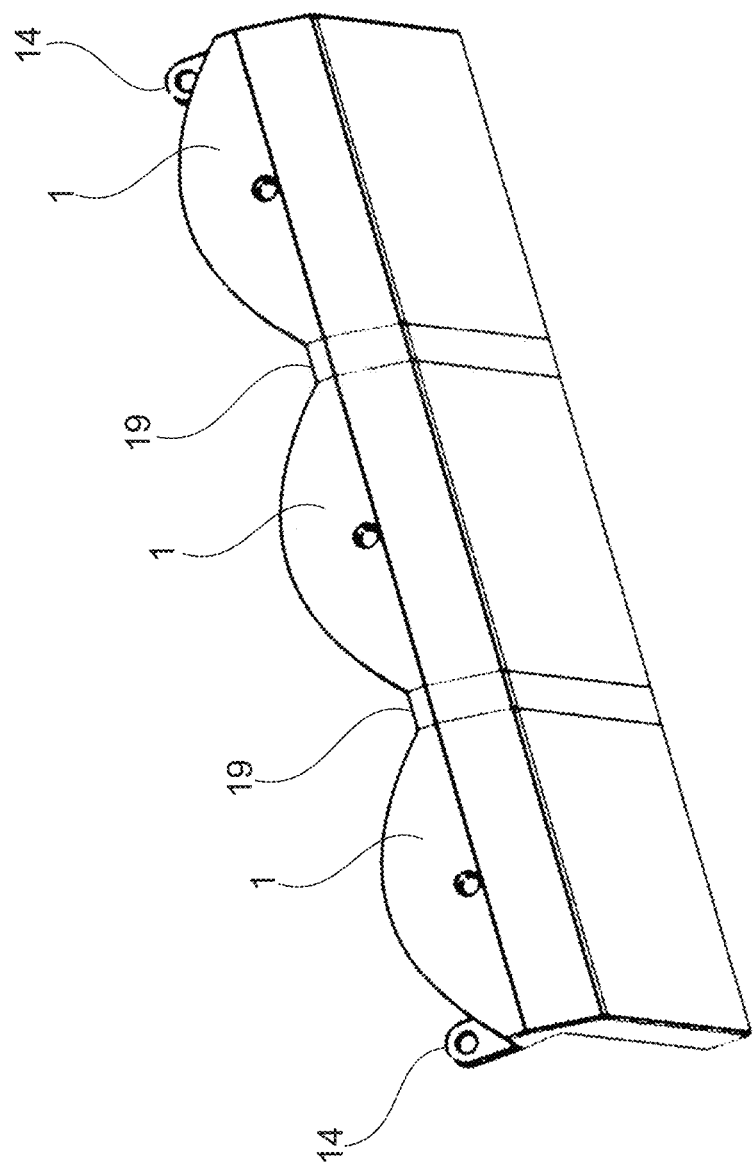
FIG. 10 shows a perspective view of a large light-guide element as it can be used in the lighting device of FIG. 9.

FIG. 10 shows using a perspective view that, advantageously, a plurality of light-guide elements 1 can also be combined into a common, contiguous light-guide element 1 instead of individual light-guide elements 1, in order to be manufactured as one large light-guide element 1 and integrated into a lighting device 2 with less mounting effort because it only has to be mounted once (see, for example, here the only two instead of six fastening elements 14 for three light-guide elements 1). As an example, light-guide elements 1 are here connected to each other by means of individual intermediate sections 19.

Figure 11:
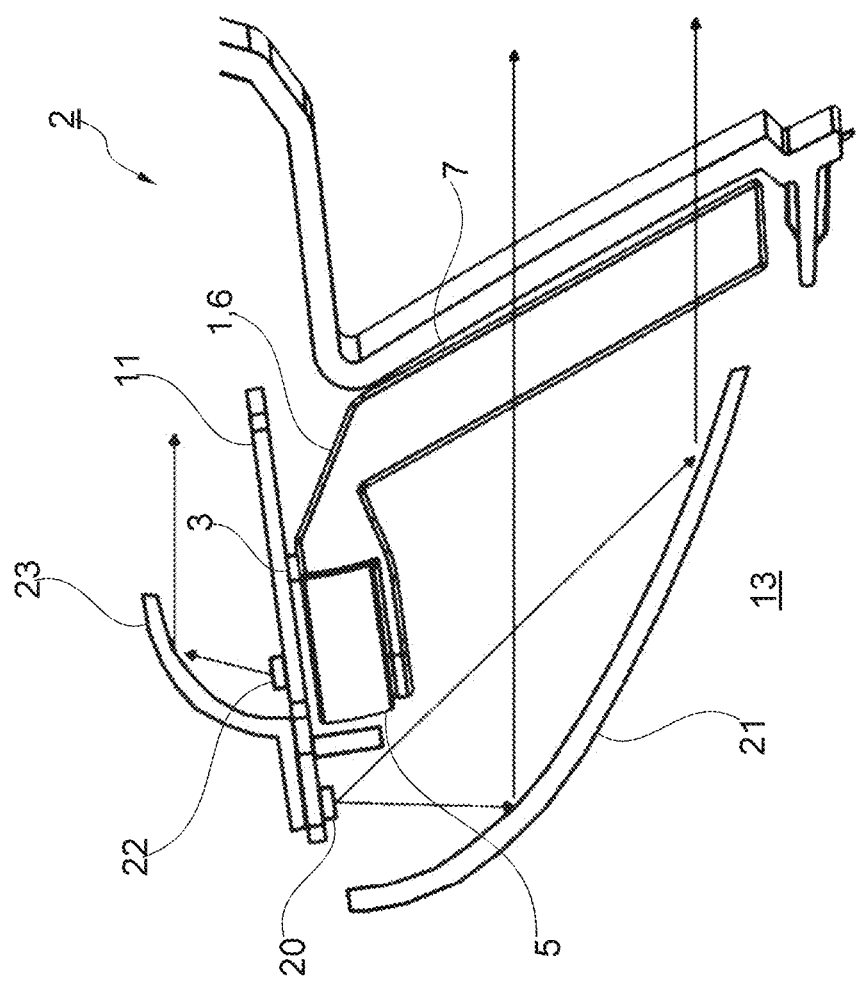
FIG. 11 shows a sectional view through a lighting device according to a an example of the invention.

FIG. 11 shows in a sectional view through a further example of a lighting device 2 that lighting device 2 can also be equipped with further or additional lighting functions in the area of light-guide element 1. For this purpose, in the example of the further light-emitting diode 20, here as an example also on printed circuit board 11 of light-emitting diode 4, a reflection surface 21 can be arranged in the area of the already mentioned free installation space 13, which provides a further light or a further light function on lighting device 2, which illuminates light-guide element 1 from the rear side.

It is conceivable that yet another light function or alternative light function is provided, as shown in the example of yet another light-emitting diode 22 and yet another reflection surface 23 in FIG. 11. In this case, the space above printed circuit board 11, in which the yet another reflection surface 23 is arranged, is used to provide a yet another light function by means of the light from the yet another light-emitting diode 22. Both light-emitting diodes 20, 22 are shown here as top-emitter LEDs, wherein other light-emitting diodes can also be used.

Figure 12:
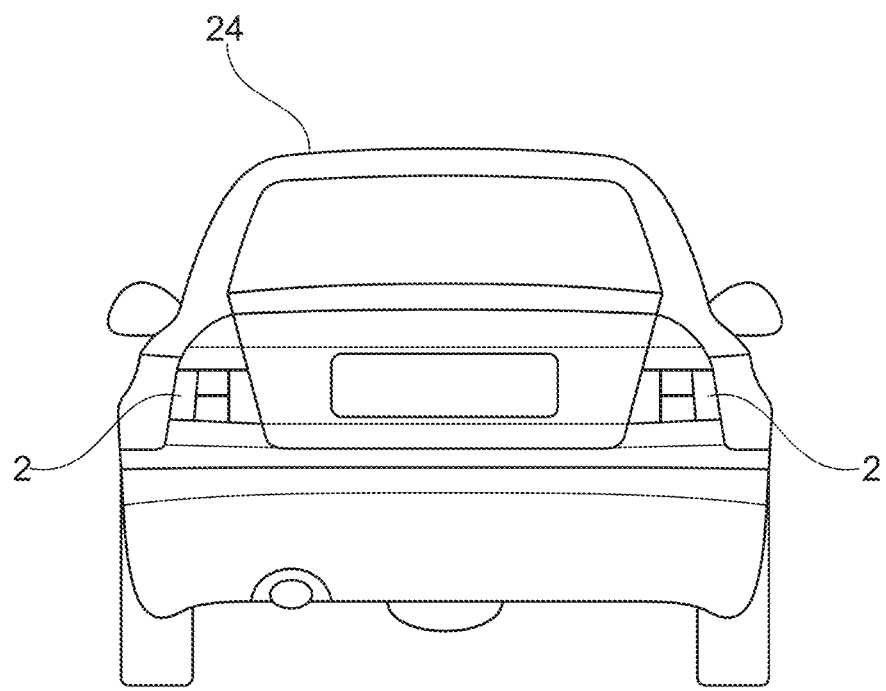
FIG. 12 shows a front view of a motor vehicle according to an example of the invention.

FIG. 12 shows a motor vehicle 24 according to an example of the invention in a front view. Motor vehicle 24 is equipped with the lighting devices 2 described above, which in the present case are designed as headlights of motor vehicle 24.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A light-guide element for a lighting device for a motor vehicle, the light-guide element comprising:
   a defined position for a light-emitting diode;
   a first reflection surface;
   a second reflection surface; and
   an outcoupling surface,
   wherein the defined position, the first reflection surface, the second reflection surface, and the outcoupling surface are arranged to one another such that light from the light-emitting diode is emitted from the defined position in a first light direction to the first reflection surface, is reflected at the first reflection surface to the second reflection surface in a second light direction that is substantially opposite to the first light direction, and is deflected from the second reflection surface onto the outcoupling surface in a third light direction, wherein the outcoupling surface is arranged at an angle to the second reflection surface in a range between 90° inclusive and 170° inclusive, and wherein a holographic element and/or optical scattering element are arranged or formed on the outcoupling surface.

2. The light-guide element according to claim 1, wherein the first reflection surface is arranged opposite to the second reflection surface.

3. The light-guide element according to claim 1, wherein the second reflection surface is set at an angle in order to deflect the light of the light-emitting diode from the second reflection surface onto the outcoupling surface.

4. The light-guide element according to claim 1, wherein the second reflection surface and the outcoupling surface are arranged next to each other.

5. The light-guide element according to claim 1, wherein the defined position is located on an upper section of the light-guide element, the upper section connecting the first reflection surface to the second reflection surface.

6. The light-guide element according to claim 1, wherein the defined position is formed as an opening or a light entry area for the light-emitting diode.

7. The light-guide element according to claim 1, wherein an optical scattering element is arranged or formed on the second reflection surface.

8. The light-guide element according to claim 1, wherein the light-guide element is a plastic injection-molded part.

9. A lighting device for a motor vehicle, the lighting device comprising:
a light guide according to claim 1; and
a light-emitting diode arranged at the defined position of the light guide.

10. The lighting device according to claim 9, wherein the lighting device comprises a plurality of light guides, with each respective light guide having the light-emitting diode arranged at the defined position, and wherein the plurality of light guides are arranged side by side in a row.

11. The lighting device according to claim 9, wherein the light-emitting diode is a top-emitter LED or a side-emitter LED.

12. The lighting device according to claim 9, wherein the lighting device comprises at least one further light-emitting diode and at least one further reflection surface, which is set up to be illuminated by the at least one further light-emitting diode.

13. A motor vehicle comprising a lighting device according to claim 9.

14. The light-guide element according to claim 1, wherein the first reflection surface is convex, and wherein both the second reflection surface and the outcoupling surface are planar.

* * * * *